United States Patent Office 3,251,642
Patented May 17, 1966

3,251,642
HALO-, SULFATO-, AND PHOSPHATO-ALKYL SULFONIUM SALTS REACTIONS WITH HYDROXYLATED AND AMINATED TEXTILES AND OTHER POLYMERS AND THE PRODUCT OF SUCH REACTIONS
Leslie Mackenzie Valentine, Sunbury-on-Thames, and Henry Fletcher, Manchester, England, assignors to Tootal Broadhurst Lee Company Limited, Manchester, England, a British company
No Drawing. Filed Feb. 21, 1961, Ser. No. 90,621
Claims priority, application Great Britain, Feb. 23, 1960, 6,286/60, 6,287/60; Apr. 8, 1960, 12,506/60
10 Claims. (Cl. 8—94.33)

The present invention relates to the treatment of polymeric materials containing at least one reactive —OH or >NH or —SH group in each molecule of the materials such as, for example, cellulosic material, such as paper, wood or cellulosic film; cellulose derivatives such as cellulose acetate; proteinaceous materials such as wool or leather; and polyvinyl alcohol. More particularly the invention concerns the treatment of cellulosic textile materials such as fibres, yarns or fabrics including woven or knitted fabrics or non-woven fabrics such as, for example, bonded fibre fabrics of cellulose or cellulose derivatives.

According to this invention therefore a polymeric material containing at least one reactive —OH >NH or —SH group in each molecule of the material is treated in the presence of an alkaline or potentially alkaline catalyst with a sulphonium salt which, in the presence of the catalyst, liberates the following sulphonium cation I with two free valencies:

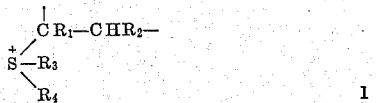

where $R_1$ and $R_2$ may be hydrogen or a lower alkyl group and may be the same or different, and $R_3$ and $R_4$ may be the group

including $CR_1=CHR_2$, or an alkyl, substituted alkyl, alicyclic, aralkyl, aromatic or heterocyclic residue and may be the same or different.

The lower alkyl group is preferably one containing 1 to 3 carbon atoms. The substituent on the alkyl residue preferably does not contain —OH, >NH or —SH groups but may be, for example, carboxyl, nitrile or halogen.

Since it is the cation which is the important part of the sulphonium salt for the purpose of the present invention the anion may be any anion.

The polymeric material may be defined as GZH wherein G represents the residue of a polymeric chain and Z represents O, N or S and the invention also includes the product of the reaction between the polymeric material and the sulphonium salt.

According to the present invention therefore there is also provided a product of the following general formula:

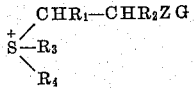

wherein G, $R_1$, $R_2$, $R_3$, $R_4$ and Z have the meanings given above or $R_3$ and/or $R_4$ can represent $CHR_1$—$CHR_2ZG$.

Substances which may be reacted with the polymeric materials to give substances which fall within this definition include:

(1) β-halo-ethyl salts such as for example

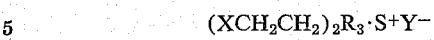

or

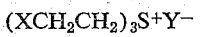

where $R_3$ has the meaning given above, X represents halogen and $Y^-$ represents an anion. An example of such a salt is tris-(β-chloroethyl) sulphonium chloride.

(2) Esters of mono-, bis- or tris-β-hydroxyethyl sulphonium salts such as, for example,

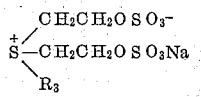

where $R_3$ has the meaning given above; or the disodium salt of tris-(β-sulphatoethyl) sulphonium inner salt, which has the formula

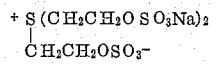

These esters of mono-, bis- or tris-β-hydroxyethyl sulphonium salts are believed to be new chemical compounds.

In carrying out the present invention the material to be treated may, for example, be impregnated with a sulphonium salt as defined above in aqueous solution, which may be alkaline, or the material may be treated with alkali as a separate step. For example, the material may be treated with an aqueous solution of the sulphonium salt and then may be treated at room temperature with an aqueous solution of a strong alkali such as caustic soda and the material subsequently washed. We prefer, therefore, to use sulphonium salts which are soluble in water or alkali. Alternatively they may be used in the form of an emulsion.

When the materials are treated simultaneously with the sulphonium salts and a potential alkali such as potassium bicarbonate, it may be necessary to dry the materials by heating or heat them to a high temperature, for example higher than 100° C. (i.e. baked) to bring about the reaction. In all cases the process of the present invention is very simple and quick to carry out and under suitable conditions it involves mere impregnation of the materials in the cold without subsequent high temperature heating.

The invention includes the treatment of cellulosic and proteinaceous textile materials with sulphonium salts and with resins or other known crease-resisting agent, or formaldehyde or other known cross-linking agent whereby the dry crease-resistance and other properties of the textile materials are improved. The improvement in dry crease-resistance is particularly noticeable in such textile materials where they have been treated with small amounts of sulphonium salts.

This combined treatment is particularly useful in the case of textile fabrics made from cellulose fibres such as cotton, linen or viscose rayon. In carrying out this combined treatment the material may be treated first with the sulphonium salt and an alkali or potential alkali and then with an aqueous solution of an intermediate condensation product of a synthetic resin such as, for example, urea-formaldehyde or melamine-formaldehyde, together with an acid catalyst followed by drying and heating to harden the resin.

Alternatively the textile materials may be treated first with an intermediate condensation product of a synthetic resin and an acid catalyst and the materials subsequently dried and heated to form the resin, and subsequently the textile materials may be treated with a sulphonium salt and an alkali or potential alkali.

Alternatively again the textile materials may be treated with a mixture of the intermediate condensation product of a synthetic resin, together wtih an acid catalyst and a sulphonium salt and the treated textile material may then be dried and heated to form the resin and then treated with alkali.

Where urea-formaldehyde resin is used to treat the textile material in such combined treatment sodium bicarbonate can be used as the catalyst for both resin formation and to bring about the reaction with a sulphonium salt.

Cellulosic or proteinaceous materials, for example paper or non-woven fabrics such as bonded fibre fabrics made from cellulosic or proteinaceous fibres, which have been reacted according to this invention with sulphonium salts as defined above in which $R_3$ and/or $R_4$ represent the group

have increased resistance to swelling as compared with unreacted materials. Woven cellulosic or proteinaceous fabrics which have been reacted according to this invention with sulphonium salts as defined above in which $R_3$ and/or $R_4$ represent the group

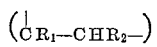

show improved resistance to shrinkage after laundering as compared with unreacted fabrics. Woven cellulosic fabrics, for example cotton or viscose rayon fabrics, have improved smooth drying properties compared with unreacted fabrics. That is to say they require less ironing after laundering. They also have the property of retaining, even when washed, creases and mechanical effects such as pleated, glazed and embossed effects made before or during treatment according to this invention and may have improved dry crease resistance as compared with unreacted fabrics. These effects are accompanied by good resistance to abrasion. The fixation of certain stiffening agents, for example starch products on polymeric materials is improved as compared with unreacted fabrics.

The reacted fabrics do not retain chlorine in such a way that they are damaged or discoloured when washed with chlorine-containing bleaching agents.

Cellulosic materials such as, for example, cotton or jute and proteinaceous materials such as, for example, leather which have been treated according to this invention have an increased resistance to the attack of mildew as compared with untreated cellulosic or proteinaceous materials.

We prefer to treat woven cellulosic fabrics for example linen, cotton or viscose rayon fabrics.

Mixtures of the polymeric materials, either with each other or with other materials, may be treated according to this invention.

In the treatment of materials likely to be damaged by alkali the type of alkaline catalyst and the treatment should be adjusted so as to minimise the damage.

Alkaline catalysts of different strengths may be used in carrying out the invention, for example sodium hydroxide, sodium carbonate or sodium silicate. Alternatively a potentially alkaline catalyst may be used such as for example sodium or potassium bicarbonate. Where the sulphonium salt is one such as a β-haloethyl salt or an ester of mono-, bis- or tris β-hydroxyethyl sulphonium salt it is necessary to have alkali present in an amount sufficient to neutralise any acid that is liberated and also a slight excess sufficient to catalyse the reaction with the polymeric material for example to raise the pH to 12.

The positive charge on the sulphur atom, which persists after the sulphonium salts as defined above have reacted with the polymeric material confers novel properties on the reacted material. For example, cellulosic fabrics have a greatly increased affinity for anionic dyes. As a result of the positive charge on the sulphonium salts as defined above, such substances are substantive to materials bearing negative surface charges, and this is of utility in the manufacture of, for example, paper.

In the case of salts which liberate the cation I in the presence of an alkaline or potentially alkaline catalyst $R_3$ and/or $R_4$ may be used to introduce other desirable properties into the compound. For example, if $R_3$ and/or $R_4$ is a long-chain alkyl group, then the substance can act as a softener or lubricant, or water-repellent when it has reacted with the polymeric material. If $R_3$ and/or $R_4$ contains chromophoric groups, or is the residue of a dyestuff, then the compound is a reactive dyestuff capable of reaction with suitable polymeric materials, such as cellulose or cellulose acetate, to give washfast dyeings.

The sulphonium salts liberating the cation I, in the presence of an alkaline or potentially alkaline catalyst, may be prepared, for example, by the addition reaction of hydrogen sulphide to ethylene oxide or substituted ethylene oxide to produce bis hydroxyalkyl sulphides which are then suitably reacted to give the sulphonium salts.

The present invention includes esters the cations of which have the general formula:

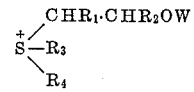

where $R_1$ and $R_2$ may be hydrogen or a lower alkyl group and may be the same or different, $R_3$ and $R_4$ may be ($CHR_1 \cdot CHR_2OW$), or an alkyl, substituted alkyl, alicyclic, aralkyl, aromatic or heterocyclic residue, and may be the same or different, and W is the residue of an acid, preferably a polybasic inorganic acid or a salt thereof or a monobasic organic acid, These esters are believed to be new chemical compounds.

We prefer to use sulphates and an example of such a compound is represented by:

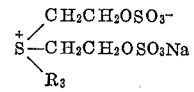

The novel esters of the present invention may be prepared by esterifying the appropriate mono-, bis- or tris-(β-hydroxyalkyl) sulphonium salt with, for example, chlorosulphonic acid, fuming sulphuric acid, acetic anhydride, propionic anhydride and if necessary the salts of the esters may be prepared by neutralisation of the acid esters with a base, for example, sodium carbonate or barium hydroxide.

The novel esters of the present invention behave as extremely efficient alkylating agents. It is this property which is utilized in the process for the treatment of polymeric materials containing at least one reactive —OH or >NH or —SH group.

The novel esters may also be used as intermediates in the formation of polymers by reacting a salt liberating the cation I, in the presence of an alkaline or potentially alkaline catalyst, with a substance having at least two functional groups. For example, the compound

may react with a diol, $HO \cdot R' \cdot OH$, to form a polymer with the structure:

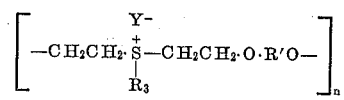

in which $Y^-$ is an anion, "$n$" can be any integer greater than 1, $R'$ may be an alkyl, alicyclic, aralkyl, aromatic or heterocyclic residue, and $R_3$ has the meaning given above, the stoichiometric amounts of reactants being used. A wide variety of reactants capable of forming polymers with the sulphonium salts will suggest themselves to those skilled in the art, such as for example diols, polyols, diamines, polyamines, alkanolamines, or dihydrazides. To form cross-linked three-dimensional networks at least one of the reactants must have a functionality of at least two and the other a functionality greater than two. Such linear or three-dimensional polymers, by virtue of the sulphonium cations, may act as anion exchange resins.

The invention will be more clearly understood by reference to the following examples which are purely illustrative.

EXAMPLE 1

*Preparation of the sodium salt of tris-(β-sulphatoethyl) sulphonium inner salt, i.e.*

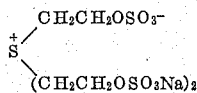

Chlorosulphonic acid (1005 gm.) was added dropwise with stirring to an ice-cooled mixture of tris-(β-hydroxyethyl) sulphonium chloride (500 gm.) and chloroform (2500 ml). The mixture was allowed to stand overnight and then added to crushed ice. Neutralisation of the aqueous layer with solid sodium carbonate followed by the addition of ethanol precipitated a solid (650 gm.) consisting of a mixture of the sodium salt of tris-(β-sulphatoethyl) sulphonium inner salt and sodium sulphate. Determinations of the two components of the mixture were made independently and yielded concordant results, the mixture containing 20% of sodium sulphate and 80% of the sulphonium salt. The sodium sulphate was determined by estimating the sulphate as barium sulphate, and the sulphonium salt by titration with sodium hydroxide assuming that one mole of the sulphonium salt is neutralised by three moles of sodium hydroxide.

EXAMPLE 2

*Preparation of barium tris-(β-sulphatoethyl) sulphonium inner salt, i.e.*

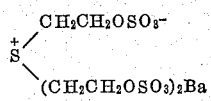

Chlorosulphonic acid (20.3 gm.) was added dropwise with stirring to an ice-cooled mixture of tris-(β-hydroxyethyl) sulphonium chloride (10.1 gm.) and chloroform (60 ml.). The mixture was allowed to stand overnight and then added to crushed ice. The aqueous layer was separated and neutralised with solid barium carbonate and the precipitated barium sulphate filtered off. Addition of ethanol to the filtrate precipitated the solid barium tris-(β-sulphatoethyl) sulphonium inner salt as a white powder (23 gm.).

*Analysis.*—Found: C, 12.4%; H, 3.1%; S, 22.1%; Ba, 23.7%. Calcd. (for $C_6H_{12}S_4O_{12}Ba2H_2O$): C, 12.4%; H, 2.8%; S, 22.2%; Ba, 23.7%.

EXAMPLE 3

*Treatment of cotton poplin*

A cotton poplin fabric was impregnated with a solution that was 0.3 molar with respect to the disodium salt of tris-(β-sulphatoethyl) sulphonium inner salt and squeezed between the bowls of a mangle adjusted so that the fabric retained about 75% of its weight of liquor. The fabric was then mounted on a pin-frame, dried at 50° C. and immersed in a 10% w./v. solution of sodium hydroxide at 20° C. for 10 minutes, washed successively with dilute acetic acid, ammonium hydroxide and water, and dried.

The treated fabric had much improved properties of resisting creasing when wet and drying smooth as compared with the untreated fabric and satisfactory abrasion resistance and tensile strength.

| Test | Untreated fabric | Treated fabric |
|---|---|---|
| S.D.I. | >50 | 13½ |
| Ringwear | 3,000 | 2,560 |
| Tensile strength, lbs./in. | 60 | 38½ |

There was no loss in strength after the treated sample had been subjected to the chlorine resistance test described in the American Association of Textile Chemists & Colourists' Tentative Test Method 92/1958.

The sample, treated as above with the sulphonium salt, was also washed twenty times in ¼% soap, ¼% soda ash at 70° C., each wash lasting thirty minutes. This washed sample also had good resistance to the chlorine test quoted above and its physical properties were substantially unchanged.

[The methods of testing used in the above and in the following examples were as follows:

[S.D.I. (Smooth Drying Index)—by the use of apparatus consisting of (1) a crease maker, (2) a drying cabinet and (3) a crease gauge. Specimen strips of fabric are cut in both warp and weft directions. These are wetted out, squeezed through a small domestic mangle, and inserted in the crease maker to form a sharp double crease. The specimen is next dried for half an hour and during drying the crease inserted in the wet fabric diminishes. The S.D.I. figure is obtained from the extent of this recovery and it indicates the ability of the fabric to recover from creases formed during normal domestic washing. The extent of this recovery is measured by placing the dried sample in the cabinet of the crease gauge and the angle of the residual crease is measured from observation of the shadow cast by the crease when illuminated by a directional light source. The smaller the figure obtained by this test the better is the fabric's property of needing little or no ironing after washing.

[Ringwear—by the use of the Ringwear Machine described in the Textile Recorder Year Book 1942-3, page H. 36.

[Tensile strength—by the use of the Heal Tensile Testing Machine.]

EXAMPLE 4

*Resistance to micro-biological attack*

The fabric as in Example 3 treated as in Example 3 was also subjected to the rotting test described in Journal of the Textile Institute, 51, T.175 (1960). The tensile strengths of the strips were measured after 9 to 30 days and the following data was obtained.

| Fabric | Time of rotting, days | Tensile strength (lbs./in.) |
|---|---|---|
| Untreated poplin | Nil | 66 |
| Do | 9 | 5 |
| Do | 30 | Nil |
| Sulphonium treated | Nil | 40 |
| Do | 9 | 26 |
| Do | 30 | 22 |

Thus the sulphonium treatment confers a considerable measure of rot-resistance to the cotton poplin fabric.

EXAMPLE 5

*Improved dyeing affinity of treated cotton fabric*

A length of cotton fabric was treated as in Example 3 with a solution of the disodium salt of tris-(β-sulphato ethyl) sulphonium inner salt as described in Example 3. Portions of this treated fabric together with samples of the untreated fabric, were then dyed with various dyestuffs as follows:

(a) The samples were boiled for 20 minutes in a solution containing:

| | |
|---|---|
| Sodium dichromate _____gms__ | 0.12 |
| 2 N sulphuric acid _____ml__ | 5 |
| Water _____ml__ | 100 | rinsed well and immersed in a solution containing:

| | |
|---|---|
| Chrome Fast Violet B (Colour Index Number 15670 _____gms__ | 0.08 |
| Sodium sulphate crystals _____gms__ | 0.4 |
| 2 N acetic acid _____ml__ | 0.5 |
| Water _____ml__ | 100 |

The initial temperature of this solution was 40° C. Over a period of about 30 mins. the solution was heated to the boil and maintained at this temperature for a further 40 minutes. The samples were then washed well and dried.

The sulphonium treated sample was found to be dyed to a deep shade whereas the sample of untreated cotton fabric was only very slightly coloured. It was also found that the sulphonium treated cotton fabric could be dyed to a similar deep shade even if the chrome pre-treatment was omitted.

(b) The samples were boiled for 45 minutes in a solution containing:

| | |
|---|---|
| Durazol Blue 8G (150% strength) (Colour Index, Number 74180 _____gms__ | 0.03 |
| Sodium sulphate crystals _____gms__ | 0.2 |
| Sodium carbonate crystals _____gms__ | 0.06 |
| Water _____ml__ | 150 | rinsed well and dried. The sulphonium treated cotton sample had dyed to a deep shade whereas the untreated cotton was only slightly coloured.

(c) A solution containing:

| | |
|---|---|
| Lissamine Fast Red B.G. (Colour Index Number 17045 _____gms__ | 0.02 |
| Sodium sulphate crystals _____gms__ | 5.0 |
| 2 N sulphuric acid _____ml__ | 2.0 |
| Water _____ml__ | 100 | was prepared and heated to 40° C.

The samples were immersed in this warm solution and over a period of about 30 minutes the solution was heated to the boil. Boiling was continued for a further 30 minutes. The samples were then well washed and dried.

The sulphonium treated sample was found to be dyed to a deep shade whereas the untreated cotton was only very slightly coloured.

(d) A cold solution containing 0.05 gm. Procion Yellow HAS (Collection of Czechoslovak Chemical Communication, Volume 25, No. 10, October 1960, pages 2783–2798) in 300 ml. water was prepared.

The samples were placed in this solution for 16 hours and then boiled for one hour in a solution containing 0.25% soap, 0.25% soda ash.

The sulphonium treated sample was found to be dyed to a deep orange whereas the untreated cotton was only very slightly tinted.

EXAMPLE 6

Treatment of cotton fabric

A cotton fabric was impregnated with a solution that was 0.5 molar with respect to tris-($\beta$-chloroethyl) sulphonium chloride and squeezed between the bowls of a mangle adjusted so that the fabric retained about 75% of its weight of liquor. The fabric was then mounted on a pin-frame and immersed in a 5% weight/volume solution of sodium hydroxide at 20° C. for 3 minutes, washed successively with dilute acetic acid, ammonium hydroxide and water and dried.

The treated fabric had much improved properties of resisting creasing when wet and drying smooth after laundering as compared with the untreated fabric and it had satisfactory abrasion resistance and tensile strength.

The treated fabric also had improved affinity for dyestuffs.

EXAMPLE 7

Treatment of paper

Strips (6" x 1") of a bleached and lightly sized paper were dipped in a solution containing 0.5 mole per litre of the sodium salt of tris($\beta$-sulphatoethyl) sulphonium inner salt and 1.6 moles per litre of NaOH. They were then allowed to drain, dried in a bin at 70° C., cured for 2 minutes at 150° C., and washed in a solution containing 0.25% soap and 0.25% soda ash at 60° C., for five minutes, rinsed and dried.

The wet breaking loads of the strips were then measured on a Scott inclined plane tensile tester with the jaws set at 5" apart. The breaking load of the treated strips was 1.2 lbs. compared with 0.3 lb. for untreated paper strips.

EXAMPLE 8

Treatment of cellulose acetate fabric

An impregnating solution was prepared by mixing:

20 ml. of a molar solution of the disodium salt of tris-($\beta$-sulphatoethyl) sulphonium inner salt
50 ml. of a two molar solution of potassium bicarbonate
30 ml. of water.

A sample of a cellulose acetate fabric was passed through this solution, passed through a mangle adjusted so that the fabric retained about 90% of its weight of liquor, dried for 90 minutes at 90° C. and washed well with water.

The treated fabric did not dissolve in acetone and had an enhanced affinity for anionic dyestuffs, e.g. Durazol Blue 8G (Colour Index Direct Blue 86).

EXAMPLE 9

Treatment of cellulose film

A sample of regenerated cellulose film was immersed in the impregnating solution described in Example 8 and the excess liquor was blotted off with filter paper. The film was then dried for 90 minutes at 90° C. and well washed.

The treated film had an improved affinity for anionic dyestuffs, for example Durazol Blue 8G, and had a somewhat greater bursting strength in the wet state than the untreated film.

| Film: | Bursting strength (lbs.) |
|---|---|
| Untreated _____ | 20, 19, 19, 19, 19. Mean 19 lbs. |
| Treated as above _____ | 26, 24, 25, 25, 26. Mean 25 lbs. |

The bursting strength was measured on a Goodbrand machine.

EXAMPLE 10

Treatment of gelatin film

A solution was prepared by mixing:

5 ml. of 0.96M solution of the disodium salt of tris-($\beta$-sulphatoethyl) sulphonium inner salt
16 ml. of 2.4M solution of potassium bicarbonate
79 ml. water.

A portion of a gelatine coated cellulose acetate film was soaked in this solution for five minutes, sponged free from excess liquor and dried for five minutes in an air oven at 80° C. This sample was then placed in boiling water together with a strip of the untreated gelatine coated film. Almost immediately the gelatine coating on the latter bubbled considerably and became detached from the backing whereas the treated film could be boiled for at least thirty minutes without bubbling or separation occurring. This demonstrated the increased resistance to swelling of the gelatine.

EXAMPLE 11

Treatment of non-woven fabric

A fibre fleece was prepared containing 55% by weight of viscose rayon fibres and 45% by weight of nylon fibres. The weight of the fleece was about 0.04 gm./sq. cm.

Two impregnating solutions A and B were prepared as follows:

|  | A | B |
|---|---|---|
| Vinyl alcohol/vinyl acetate copolymer, the alcohol being the major component (10% w./w. solutions), ml | 200 | 200 |
| 0.96M solution of the disodium salt of tris-(β-sulphatoethyl) sulphonium inner salt | 40 |  |
| 2.4M solution of potassium bicarbonate | 80 | 80 |
| Water to 1,000 ml. |  |  |

Separate portions of the fleece were impregnated with solutions A and B, dried and baked for 3 minutes at 140° C. The increase in weight was about 12% on the treated fabric in both cases.

Strips, one inch wide, were cut from each fleece and their tensile strengths were measured after immersion in cold water for 1 minute.

The results are given below.

Web:                          Wet tensile strength (lbs./in.)
    Impregnated with solution A _ 1.7, 1.7, 1.6, 1.9, 1.5, 1.5. Mean 1.6.
    Impregnated with solution B _ 0.1, 0.2, 0.1, 0.2, 0.2, 0.2. Mean 0.15.

EXAMPLE 12

Stiffening with starch and pleating viscose rayon fabric

Two impregnating solutions were prepared as follows:

|  | A | B |
|---|---|---|
| 20% solution of an etherified starch product, gms | 50 | 50 |
| 0.96M solution of the disodium salt of tris-(β-sulphatoethyl) sulphonium inner salt, gms | 20 |  |
| Water to 200 ml. |  |  |

Samples of a spun viscose rayon fabric were padded through these solutions and passed through the bowls of a mangle adjusted to leave 100% w./w. liquor on the fabric. Both samples were then dried and pressed into sharp pleats. The folded samples were then immersed for two minutes in a cold 10% w./v. solution of potassium hydroxide, rinsed well and boiled for 30 minutes in a solution containing 0.25% w./v. soap and 0.25% w./v. soda ash.

The sample treated with impregnating solution A still retained its sharp pleats while the sample treated with solution B showed only very slight marks where the pleats had been made.

The sample treated with solution A was very stiff after boiling while the other sample was only slightly stiffer than the original untreated rayon fabric.

EXAMPLE 13

Combined treatment with resin and sulphonium salt

Three impregnating solutions were prepared as follows:

(A)

600 mls. of a 45% w./v. solution of the disodium salt of tris-(β-sulphatoethyl) sulphonium inner salt
400 ml. of water (B)

400 ml. of melamine/ethylene urea formaldehyde resin having a 50% solids content
50 ml. of a 20% w./v. solution of zinc nitrate
550 ml. of water (C)

600 ml. of a 45% w./v. solution of the disodium salt of tris-(β-sulphatoethyl) sulphonium inner salt
400 ml. of melamine/ethylene urea formaldehyde resin having a 50% solids content
10 gm. of zinc nitrate crystals Samples of cotton poplin fabric were treated as follows:

Sample 1 was immersed in solution A and passed through a mangle adjusted so that the fabric retained 50% of its own weight of liquor, dried and soaked in 10% w./v. sodium hydroxide solution for 3 minutes. It was then washed in water, dilute acetic acid and water.

Sample 2 was treated as sample 1 and then immersed in impregnating solution B. It was then passed through a mangle adjusted as above, dried, baked for 3 minutes at 150° C. and washed in hot soap solution and water.

Sample 3 was treated in impregnating solution B only. The subsequent processing was as described for sample 2.

Sample 4 was treated as sample 3 and then immersed in impregnating solution A. It was then dried, soaked for 3 minutes in a 10% w./v. solution of sodium hydroxide and washed in water, dilute acetic acid and water.

Sample 5 was soaked in solution C, passed through a mangle adjusted as above, dried and baked for 3 minutes at 150° C. It was then soaked for 3 minutes in a 10% w./v. solution of sodium hydroxide, and washed in water, dilute acetic acid and water.

All samples were dried, conditioned and tested. The samples treated with resin contained about 10% by weight of resin.

| Sample No. | Ringwear | C.R. | S.D.I. |
|---|---|---|---|
| 1 | 1,370 | 3.20, 3.15 | 11.5, 11.5 |
| 2 | 1,280 | 3.30, 3.25 | 10.5, 10.5 |
| 3 | 1,410 | 3.30, 3.15 | 10.5, 10.5 |
| 4 | 1,050 | 3.50, 3.35 | 10.5, 10.5 |
| 5 | 1,620 | 3.25, 3.10 | 10.5, 10.0 |

[Dry crease resistance (C.R.) was measured by the machine referred to on page 388 of "An Introduction to Textile Finishing," by J. T. Marsh, published by Chapman and Hall in 1948.]

EXAMPLE 14

Preparation of a phosphate ester of bis-(β-hydroxethyl) ethyl sulphonium bromide and treatment of paper 22 gms. of bis-(β-hydroxyethyl) ethyl sulphonium bromide were refluxed for 4 hours with 4 gms. of phosphorus pentoxide in sodium dried benzene. After evaporation of the benzene, the resultant viscous mass was extracted with water and the aqueous solution neutralised to pH 6.0 with dilute sodium carbonate solution. This solution was then evaporated to dryness and extracted with methanol. The extract was analysed and found to consist of 60% of the required phosphate ester and 40% of the original sulphonium bromide.

An impregnating solution was prepared by dissolving 2 gms. of this mixture in 50 ml. of water. An alkali resistant paper was immersed in this solution, lightly blotted, dried and immersed for three minutes in an 0.4% w./v. solution of sodium hydroxide. After prolonged washing, the treated paper was found to have an enhanced affinity for acid dyes (for example Durazol Blue 8G) as compared with the paper treated only in the alkali.

We claim:
1. A product having the following formula:

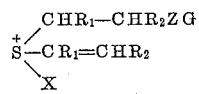

wherein $R_1$ and $R_2$ are selected from the class consisting of hydrogen and lower alkyl; ZG represents the polymer chain remaining after removal of H from a polymer represented by GZH where Z is selected from the group consisting of O, N and S and said polymer is selected from the group consisting of proteinaecous textile fibers, leather, cellulosic fibers and films, starch, polyvinyl alcohol and gelatin, and X is a radical selected from the class consisting of —$CR_1$=$CHR_2$, —$CHR_1$—$CHR_2ZG$, alkyl and aralkyl.

2. The product of claim 1 wherein $R_1$ and $R_2$ are hydrogen; Z is O; G is a cellulosic chain; and X is

3. Process which comprises treating polymeric material selected from the group consisting of proteinaceous textile fibers, leather, cellulosic fibers and films, starch, polyvinyl alcohol and gelatin, in the presence of a member selected from the group consisting of alkaline and potentially alkaline catalysts, with an agent selected from the group consisting of bis- and tris-β-haloalkyl sulphonium salts, bis-, and tris-β-sulphatoalkyl sulphonium salts and the poly-β-phosphatoalkyl sulphonium salts wherein the alkyl is lower alkyl providing two carbon atoms between the sulphur atom and the halo-, sulphato- and phosphato-groups of said sulphonium salts, the catalyst being present in an amount sufficient to neutralize any acid liberated and to provide a slight excess sufficient to catalyse the reaction with the polymeric material.

4. Process as claimed in claim 3 in which the lower alkyl is ethyl.

5. Process as claimed in claim 3 in which the sulphonium salt is

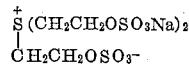

6. Process as claimed in claim 3 in which the polymeric material is treated with an aqueous solution of the sulphonium salt and then with an aqueous solution of a strong alkali at room temperature and then washed.

7. Process as claimed in claim 3 in which the polymeric material is treated simultaneously with the sulphonium salt and a potentially alkaline catalyst and then heated to a high temperature.

8. Process as claimed in claim 3 in which the polymeric material is a member selected from the group consisting of cellulosic and proteinaceous textile material and in which the treatment includes a crease-resisting agent in addition to said sulphonium salt.

9. Process as claimed in claim 8 in which the polymeric material is treated with (a) the sulphonium salt and the member selected from the group consisting of the alkaline and potentially alkaline catalyst; and (b) with an aqueous solution of an aminoplast precondensate together with an acid catalyst then dried and heated to harden the resin, said polymeric material being treated first with one of (a) and (b) and then with the other.

10. Process as claimed in claim 8 in which the polymeric material is treated with a mixture of an aminoplast precondensate together with an acid catalyst and the sulphonium salt, dried and heated to form the resin and then treated with the member selected from the group consisting of the alkaline and potentially alkaline catalysts.

References Cited by the Examiner

UNITED STATES PATENTS

| | | | |
|---|---|---|---|
| 1,825,102 | 9/1931 | Spofford | 8—3 |
| 2,056,166 | 10/1936 | Cohen | 8—3 |
| 2,092,702 | 9/1937 | Nathansohn | 8—116 |
| 2,132,342 | 10/1938 | Jackson | 8—128 |
| 2,132,345 | 10/1938 | Reichert | 8—128 |
| 2,203,883 | 6/1940 | Steindorff | 260—457 |
| 2,283,438 | 5/1942 | Hentrich | 260—457 |
| 2,579,871 | 12/1951 | Schoene | 8—94.33 |
| 2,670,265 | 2/1954 | Heyna | 8—1.211 |
| 2,720,509 | 10/1955 | Dees | 260—79 |
| 2,727,027 | 12/1955 | Monson | 260—112 |
| 2,728,759 | 12/1955 | Keil | 260—112 |
| 2,731,323 | 1/1956 | Reinhardt | 8—116 |
| 2,772,267 | 11/1956 | Malm | 260—230 |
| 2,801,239 | 7/1957 | Hiatt | 260—230 |
| 2,806,843 | 9/1957 | Welch | 260—79 |
| 2,971,815 | 2/1961 | Bullock. | |
| 3,000,762 | 9/1961 | Tesoro. | |
| 3,046,075 | 7/1962 | Kantner | 8—1.212 |

FOREIGN PATENTS 589,127    9/1960    Belgium.

OTHER REFERENCES

Stahmann et al., J. Org. Chem., vol. II, 1946, pp. 704–718, 719–735.

Stein et al., J. Org. Chem., vol. II, 1946, pages 664–674.

Review of Textile Progress, vol. 12, 1960, pub. 1962, pp. 355–360, pub. by Butterworth & Co. Ltd., Washington, D.C.

NORMAN G. TORCHIN, *Primary Examiner.*

WILLIAM B. KNIGHT, *Examiner.*

H. WOLMAN, D. LEVY, *Assistant Examiners.*